(12) United States Patent
Kirtland

(10) Patent No.: US 7,740,267 B2
(45) Date of Patent: Jun. 22, 2010

(54) NESTING STABILIZER

(75) Inventor: Ralph P. Kirtland, Staunton, VA (US)

(73) Assignee: Archimedes Intellectual, LLC, Staunton, VA (US)

( * ) Notice: Subject to any disclaimer, the term of this patent is extended or adjusted under 35 U.S.C. 154(b) by 272 days.

(21) Appl. No.: 12/078,682

(22) Filed: Apr. 3, 2008

(65) Prior Publication Data

US 2009/0250903 A1    Oct. 8, 2009

(51) Int. Cl.
  *B60D 1/00* (2006.01)
  *F16D 1/08* (2006.01)
(52) U.S. Cl. .................. 280/506; 224/519; 403/362
(58) Field of Classification Search .......... 280/504, 280/506, 507; 224/519, 521; 403/362, 368, 403/370
  See application file for complete search history.

(56) References Cited

U.S. PATENT DOCUMENTS

| 4,040,641 | A |   | 8/1977  | Riecke |
|-----------|---|---|---------|--------|
| 5,333,888 | A |   | 8/1994  | Ball |
| 5,423,566 | A |   | 6/1995  | Warrington et al. |
| 5,593,172 | A |   | 1/1997  | Breslin |
| 5,685,686 | A |   | 11/1997 | Burns |
| 5,730,456 | A | * | 3/1998  | Bowers ............... 280/507 |
| 5,988,667 | A |   | 11/1999 | Young |
| 6,105,989 | A |   | 8/2000  | Linger |
| 6,131,938 | A |   | 10/2000 | Speer |
| 6,142,502 | A |   | 11/2000 | Breslin |
| 6,502,845 | B1|   | 1/2003  | Van Vleet |
| 6,598,897 | B1|   | 7/2003  | Patti |
| 6,835,021 | B1|   | 12/2004 | McMillan |
| 6,974,147 | B1| * | 12/2005 | Kolda ............... 280/506 |
| 7,077,417 | B2|   | 7/2006  | Shoemaker et al. |
| 2002/0047249 | A1 |   | 4/2002 | McCoy et al. |
| 2006/0255562 | A1 | * | 11/2006 | Lantaigne ............... 280/506 |
| 2008/0012267 | A1 | * | 1/2008 | Simon ............... 280/504 |

* cited by examiner

*Primary Examiner*—Lesley Morris
*Assistant Examiner*—Marc A Scharich
(74) *Attorney, Agent, or Firm*—Edwards Angell Palmer & Dodge LLP

(57) ABSTRACT

A nesting stabilizing device for limiting the rotation of accessories connecting to a hitch receiver with an outward end defining an opening. The outward end of the hitch receiver has a protruding ring about an outward surface. The nesting stabilizer has a base with a body portion receivable in the hitch receiver and also has a flanged collar for engaging the protruding ring on the hitch receiver in an interference fit, the flanged collar further being coupled with an accessory. In addition, the nesting stabilizer includes a fastener operatively connected with the base for urging the flanged collar against the outward end to cause the flanged collar to engage the protruding ring on the outward end. The nesting stabilizer connects the accessory to the hitch receiver upon engagement of the flanged collar with the protruding ring on the hitch receiver.

5 Claims, 4 Drawing Sheets

NESTING STABILIZER

FIELD OF THE INVENTION

This invention is related to a stabilizing system for connecting various accessories to a hitch receiver.

BACKGROUND OF THE INVENTION

Hitch receivers are commonly used for attaching accessories to vehicles. The accessories are bicycle racks, cargo baskets, or various carriers and the like, and they are usually attached to a vehicle at its back end. Typically, a hitch receiver is a tube which is substantially square in cross-section (often with rounded corners) with a protruding ring about the outward-facing edge and attached to the vehicle beneath a rear bumper. The accessory is typically intended to support and hold one or more bicycles, cargo, or other similar articles.

The typical hitch receiver is ideal for supporting the typical accessory because the hitch receiver is located at the back end of the vehicle and is securely attached to the vehicle. For example, the hitch receiver is commonly welded or otherwise secured to a chassis or frame of the vehicle.

Various devices for connecting an accessory to a hitch receiver are known, but such devices suffer from a number of imperfections or weaknesses. Many of these imperfections arise because of the requirements that the connecting device should be easy to insert into the hitch receiver, and easy to attach securely to the hitch receiver after insertion. For example, accessories connected to hitch receivers by known devices tend to wobble relative to the hitch receiver (and the vehicle) as the vehicle travels, even where the connection is relatively secure. If not secured again to the hitch receiver after wobbling starts, the connecting device can gradually become less secure, even to the extent of disconnection. In addition, wobbling movement of the accessory relative to the hitch receiver can lead to the bicycles or other cargo on the accessory being jarred loose, and falling off the accessory. Also, known connecting devices do not provide for relatively fast and simple disconnection of the accessory from the hitch receiver.

Clamps and similar fasteners are often used to minimize movement of the accessory relative to the hitch receiver. However, these known clamps usually operate to secure the accessory to any two of four sides of the hitch receiver, so these clamps permit movement of the accessory relative to the hitch receiver in two directions. Other approaches have been to attempt to secure the hitch bar from the inside of the hitch receiver using a fitted plate and draw bolt or by using a split wedge drawn up inside the hitch receiver by use of a dog-legged bolt. These are both inadequate solutions due to the extra modifications and mechanics involved in fitting the pieces together.

U.S. Pat. No. 7,077,417 to Shoemaker addresses this problem through the use of a wedge-shaped (incurvate, actually) bar inserted into a hitch receiver, the purpose of which is to have the expanding sides of the bar contact the inside of the hitch receiver as the bar was drawn into the hitch receiver via a screw action component. This arrangement presents the possibility of weakening and perhaps even splitting the hitch receiver much the same as a wedge driven into a piece of firewood splits the wood. A failure of this type would render the hitch receiver unusable, necessitating its replacement, or worse, could cause the loss of an accessory (or subsequent towing application) at highway speeds.

A better concept would be to compress the hitch receiver from the outside in, as contrasted to expanding the hitch receiver from the inside out. This yields two significant benefits: a) a reduction in the chance of premature fatigue failure of the hitch receiver, and b) greater lateral stability by gripping the outside of the hitch receiver rather than the inside (for exactly the same reason that more torque can be applied to larger bolt-heads than to smaller ones).

This approach grips the outside of the hitch receiver due to the realization that the exterior dimensions of a hitch receiver are nearly as universal as the interior dimensions, thanks to the relatively standard size of the reinforcing ring attached to the outboard end of the hitch receiver. Historically this ring has been fabricated out of the next largest square tubing size from that of the hitch receiver's main tube. Recently, some manufacturers have employed a method of using a one-piece tube and deforming the outboard end to mimic the reinforcement qualities of a separate reinforcing ring, but even in these cases the exterior dimensions remain fairly consistent.

The present invention satisfies the need for an improved connecting device for connecting an accessory to a hitch receiver that satisfies the ease-of-attachment requirement as well as solving the lateral wobbling, rattling and loosening problems inherent with previously-described solutions. It also satisfies these requirements by using the existing infrastructure inherent in every hitch receiver on the market, namely the securing pin hole and the protruding ring about the outward end of the hitch receiver. Because of the unique design of the flanged collar, the present invention accommodates various sizes of protruding rings and secures the accessory on all four sides of the hitch receiver with great affect and without having to employ modifications to the hitch receiver.

SUMMARY OF THE INVENTION

The present invention provides a connection device for connecting an accessory to a hitch receiver with an outward end defining an opening with a protruding ring about its outward end. This connecting device has a base, a flanged collar, a draw bolt and securing pin. The base includes a body portion receivable in the hitch receiver which is adapted for coupling with the hitch receiver to locate the base in a predetermined position therein and a mounting plate to which a standard vehicle accessory would be attached. The flanged collar is for engaging the protruding ring about the outward edge of the hitch receiver in an ever-tightening interference fit upon engagement and drawing of the draw bolt and securing pin, the collar and body being coupled to the accessory. The draw bolt is operatively engaged with a wrench or similar tightening device, the rotation thereof drawing the securing pin and flanged collar closer together, engaging the flanged collar in an ever-tightening relationship with the protruding ring about the outside edge of the hitch receiver.

The flanged collar may be adapted to engage the protruding ring about the outward edge of the hitch receiver substantially along the entire periphery edge disposed around the opening in an interference fit when the flanged collar is urged against the protruding ring about the outward end.

The draw bolt and securing pin may be operable by rotational tightening to urge the flanged collar into frictional contact with the protruding ring about the end of the hitch receiver.

The draw bolt and securing pin may be operable to disengage the flanged collar from the protruding ring about the end of the hitch receiver.

The base may include a threaded draw bolt portion extending from the outward face portion into the hitch bar portion and attached to a sliding pin barrel also in the hitch bar portion. The sliding pin barrel, with the securing pin inserted, will remain stationary with respect to the hitch receiver. When the draw bolt is tightened, the flanged collar will be urged against the protruding ring about the outward edge of the hitch receiver. Also, when the draw bolt is un-tightened, the flanged collar will disengage from the protruding ring about the outward edge of the hitch receiver. The device is in an assembled state when the securing pin is engaged in the pin barrel and the flanged collar is disengaged from the protruding ring about the outward edge.

The invention may include a flanged collar for securing an accessory to a hitch receiver with an outward end defining an opening. The flanged collar has an exterior part extending outside the outward end when the collar is urged inwardly against the outward end for engaging the protruding ring about the outward end. The exterior part prevents inward movement of the flanged collar upon engagement thereof. The flanged collar is adapted to be coupled with the accessory so that the accessory is secured to the hitch receiver upon the engagement of the flanged collar to the protruding ring about the outward edge of the hitch receiver.

The exterior part may be adapted to engage the outward end substantially along a periphery edge disposed around the opening in an interference fit when the flanged collar engages the protruding ring about the outward end.

The draw bolt may include a disengaging collar mounted to the draw bolt on the opposite side of the mounting plate from the draw bolt head. When the draw bolt is rotated in a loosening direction, this disengaging collar pushes the mounting plate and flanged collar away from the outward end of the hitch receiver, disengaging the flanged collar from the protruding ring about the outward end of the hitch receiver, allowing the easy removal of the securing pin, thereby allowing the removal of the invention and attached accessory from the hitch receiver.

BRIEF DESCRIPTION OF THE DRAWINGS

The invention will be better understood with reference to the attached drawings, in which.

DETAILED DESCRIPTION OF THE PREFERRED EMBODIMENT(S)

Figure 1A:
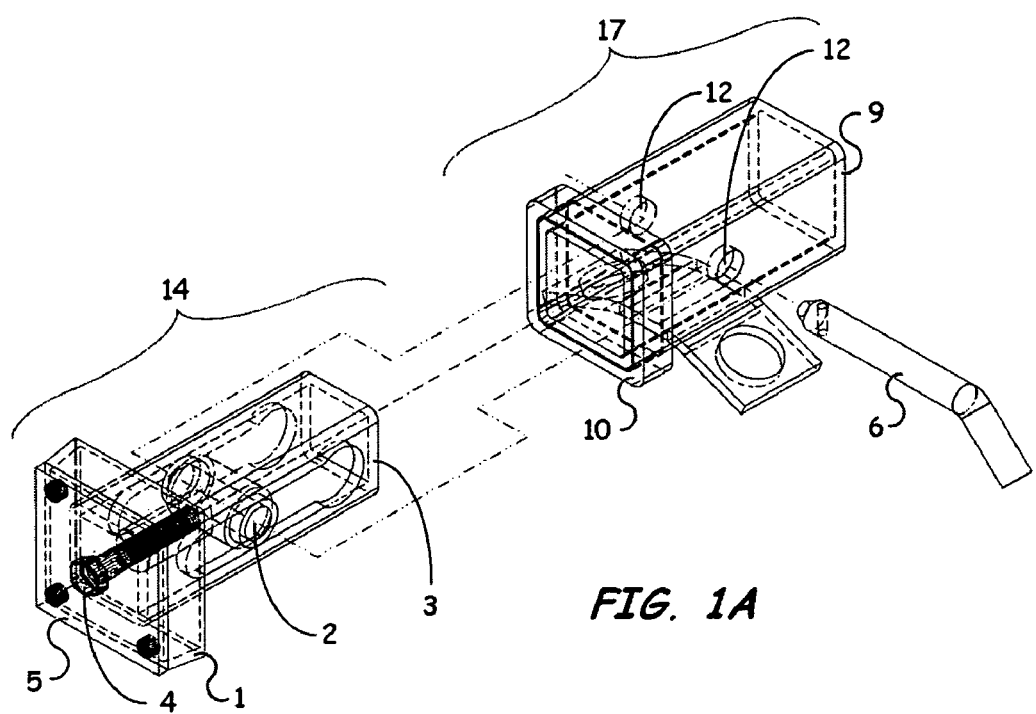
FIG. 1A is an exploded transparent isometric view showing the method of attachment of the invention into a hitch receiver.

FIG. 1A shows the method of mating of the invention final assembly 14 to hitch receiver 17. Final assembly 14 is inserted into hitch receiver 17 until the opening in sliding pin barrel 2 aligns with holes 12 in hitch receiver 17. Once holes align, securing pin 6 is inserted through the opening in sliding pin barrel 2 and holes 12 in hitch receiver 17 and draw bolt 4 is tightened, forcing protruding ring 10 deeper into flanged collar 1 until friction prevents it from proceeding any further. At this point, the invention final assembly 14 is securely and tightly mated to hitch receiver 17.

Figure 1B:
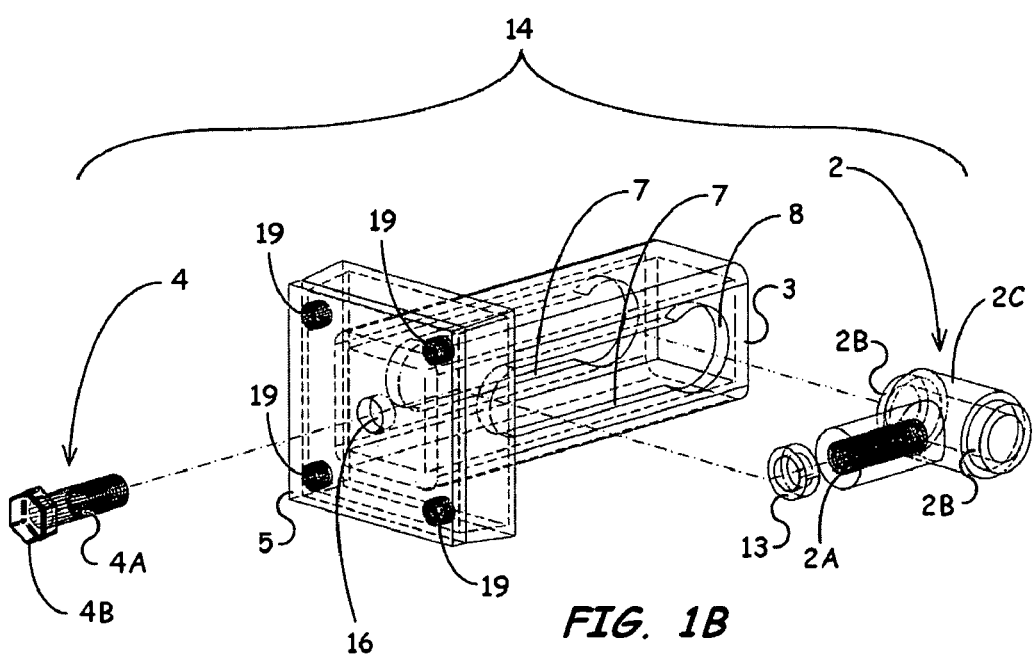
FIG. 1B is an exploded transparent isometric view of the invention showing its assembly.

FIG. 1B details the final assembly of the movable subcomponents of the invention final assembly 14. Draw bolt shaft 4A is inserted through hole 16 and into disengaging collar 13 until draw bolt head 4B is against outer face of mounting plate 5 and disengaging collar 13 is against inner face of mounting plate 5 at which point disengaging collar 13 is securely fastened to draw bolt 4. Sliding pin barrel 2 is then inserted into base-body 3 by passing pin barrel 2C through opening 8 and threaded barrel 2A through channel 7. Once sliding pin barrel 2 is centered side-to-side in base-body 3, it can be slid toward and engaged upon draw bolt 4 by passing pin barrel 2C inboard of base-body 3 sides and allowing pin barrel shoulders 2B to ride on channel 7 edges.

Figure 1C:
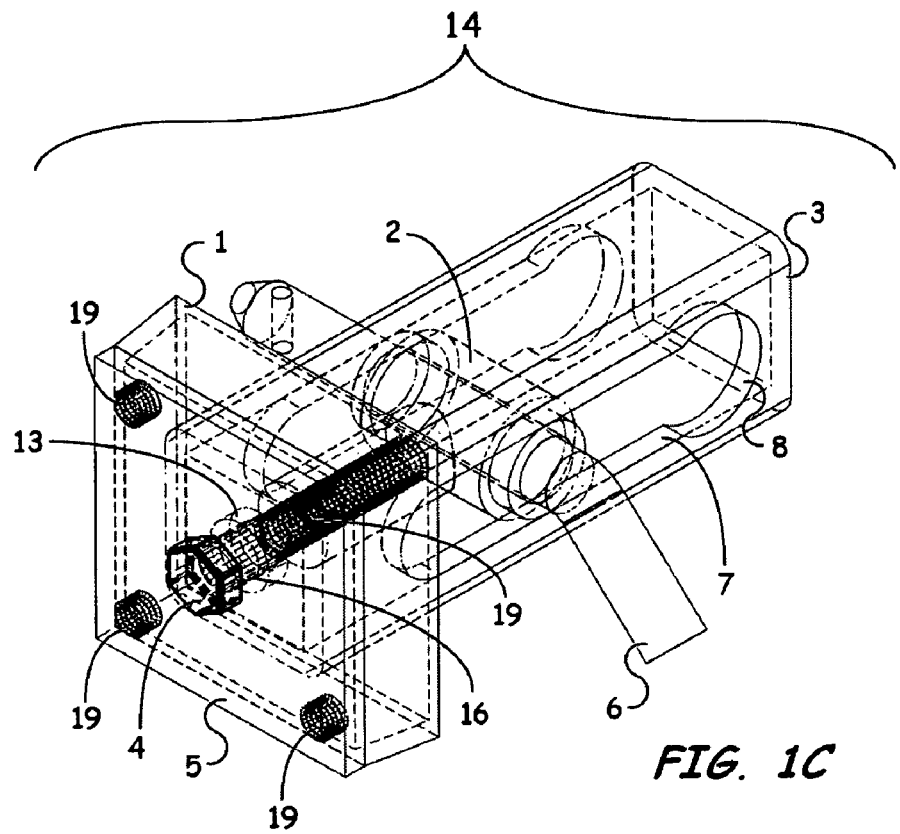
FIG. 1C is a transparent isometric view of an assembled example of the connecting device of the invention.

FIG. 1C details the subcomponents integrated into final assembly 14 which is the invention. Flanged collar 1 is attached to the mounting plate 5 portion of the base which is itself attached to the base-body 3. Draw bolt 4 passes through hole 16 and disengaging collar 13 and then threads into sliding pin barrel 2 which rides in channel 7 after being inserted through opening 8. Securing pin 6 is a standard pin used for securing receiver hitches and accessories.

Figure 1D:
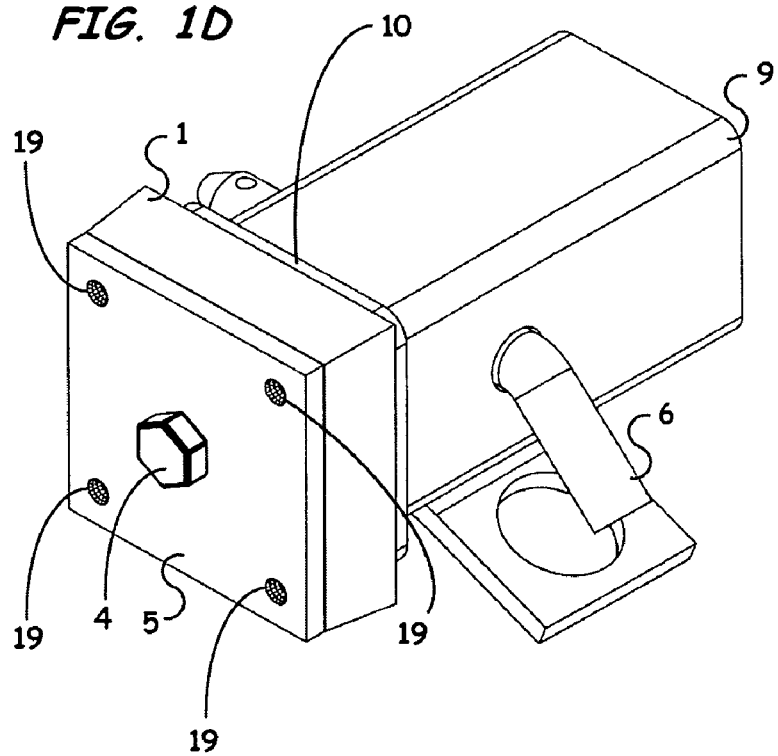
FIG. 1D is a solid isometric view of a preferred embodiment of the connecting device of the invention properly seated in a hitch receiver.

FIG. 1D shows the invention mated to a standard hitch receiver. Flanged collar 1 overlaps the protruding ring 10 located at the outboard end of hitch receiver body 9. Once securing pin 6 is inserted through hitch receiver body 9 and sliding pin barrel 2 (hidden) via securing holes 12, tightening of draw bolt 4 forces protruding ring 10 deeper into flanged collar 1 until friction prevents it from proceeding any further. At this point, the invention is securely and tightly mated to the hitch receiver. Also visible are optional mounting holes 19 which can be used for securing mounting plate 5 to a vehicle accessory (not shown).

Figure 2A:
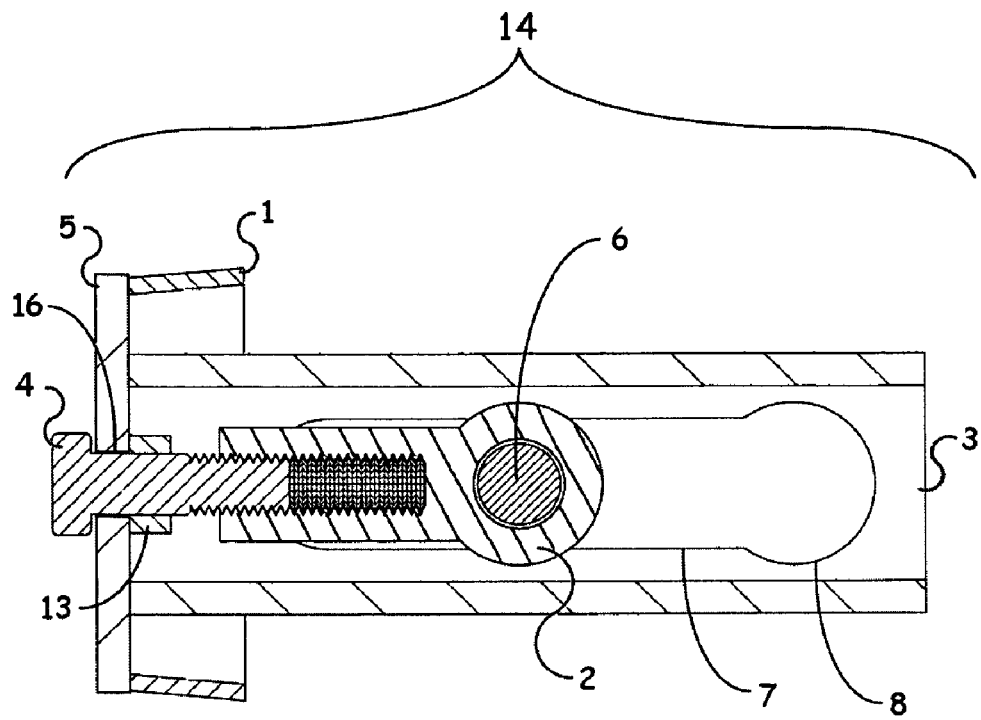
FIG. 2A is a side cut-away view of an assembled example of the connecting device of the invention.

FIG. 2A is a side cut-away view of the assembled invention 14, showing the relationships of the various subcomponents. Flanged collar 1 is attached to the mounting plate 5 portion of the base which is itself attached to the base-body 3. Flanged collar 1 splays outwardly from said mounting plate 5 toward the base-body 3. Draw bolt 4 passes through hole 16 and disengaging collar 13 and then threads into sliding pin barrel 2 which rides in channel 7 after being inserted through opening 8. Securing pin 6 is a standard pin used for securing receiver hitches and accessories.

Figure 2B:
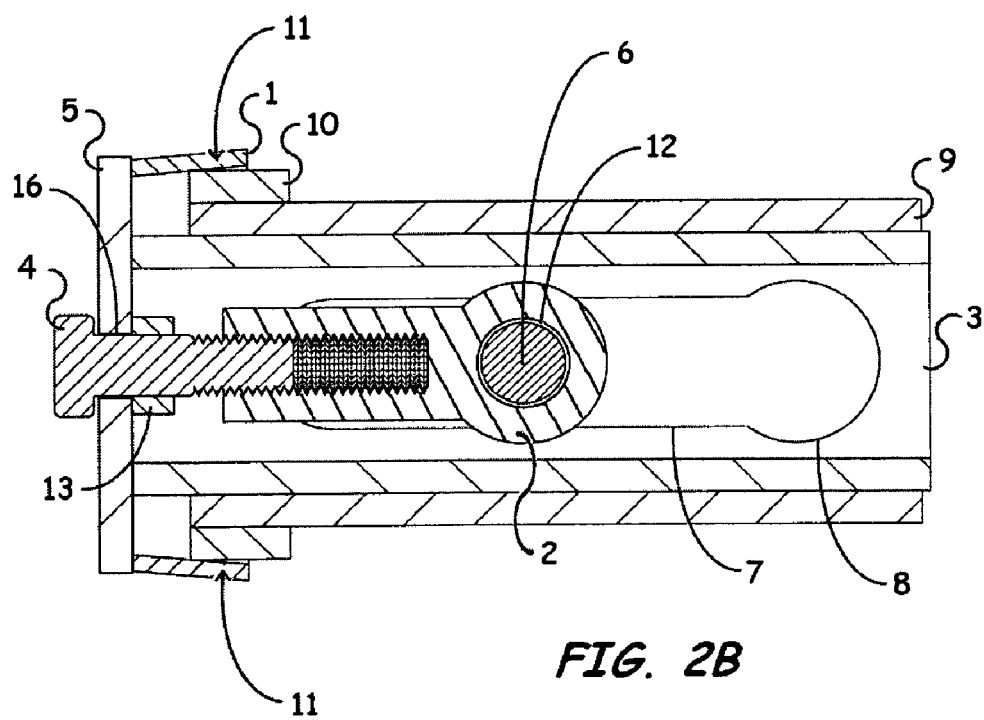
FIG. 2B is a side cut-away view of a preferred embodiment of the connecting device of the invention properly seated in a hitch receiver.

FIG. 2B a side cut-away view of the assembled invention mated to a hitch receiver where flanged collar 1 overlaps the protruding ring 10 in general area 11. Disengaging collar 13 is secured to draw bolt 4 in such a way as to prevent it from moving longitudinally along the shaft such that when draw bolt 4 is loosened, disengaging collar 13 exerts force against mounting plate 5 in such a way as to increase the distance between mounting plate 5 and sliding pin barrel 2. If securing pin 6 is still engaged in securing holes 12 of hitch receiver body 9 and through sliding pin barrel 2, this force works to disengage flanged collar 1 from protruding ring 10.

Figure 3:
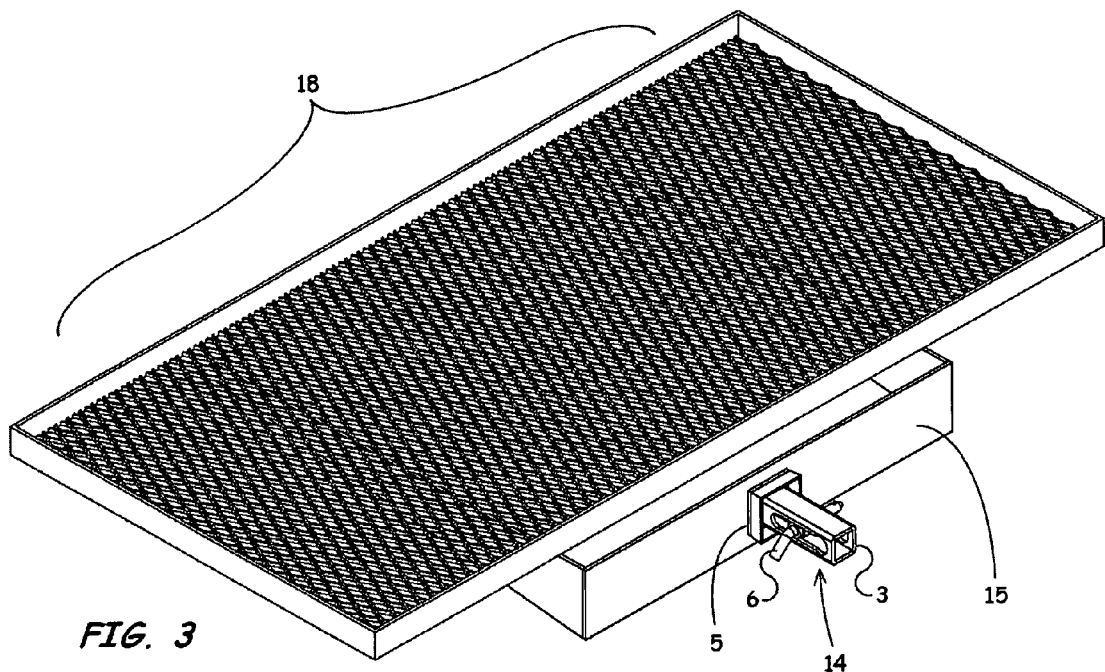
FIG. 3 is a reversed isometric solid view showing the invention attached to a cargo tray accessory.

FIG. 3 shows the invention in an exemplary embodiment, mated to a cargo tray. Final assembly 14 mates to vehicle accessory 18 by attaching accessory mounting face 15 to invention mounting plate 5. The entire assembly would then be temporarily mounted on a vehicle by removing securing pin 6 and sliding base-body 3 into vehicle's hitch receiver body (not shown).

It will be appreciated by those skilled in the art that the invention can take many forms, and that such forms are within the scope of the invention as claimed. Therefore, the spirit and scope of the appended claims should not be limited to the descriptions of the preferred versions contained herein.

The invention claimed is:

1. A stabilizing apparatus connectable with a hitch receiver for a vehicle, the hitch receiver having a protruding ring at one end, the stabilizing apparatus limiting free-play movement of an accessory attached thereto, the stabilizing apparatus comprising:
 - a hollow base-body insertable into said hitch receiver, said base-body having a mounting plate attached to a non-insertable end of said base-body;
 - a flanged collar attached to said mounting plate, said mounting plate having a center hole;
 - a T-shaped sliding pin barrel formed of two intersecting cylinders, one of said cylinders having a through-hole and arranged transversely in said base-body and having protruding pin barrel shoulders riding on longitudinal channels arranged on opposite sides of said base-body, the other said cylinder having a threaded hole with one opening facing an inner face of said mounting plate; and
 - a threaded draw bolt insertable through said center hole of said mounting plate and screwably engageable with said threaded hole of said other cylinder of said T-shaped sliding pin barrel so as to force an interference fit between said flanged collar and said protruding ring when said draw bolt is rotated in said threaded hole so as to reduce free-play movement between said stabilizing apparatus and said hitch receiver whenever a securing pin is inserted into opposing holes in said hitch receiver and said through-hole in said transverse cylinder of said T-shaped sliding pin barrel.

2. The stabilizing apparatus as recited in claim 1, further including a disengaging collar securely fastened to said draw bolt and rotatably arranged against said inner face of said mounting plate so as to prevent longitudinal movement of said draw bolt in said center hole of said mounting plate.

3. The stabilizing apparatus as recited in claim 1, wherein said mounting plate contains a mounting means for mounting an accessory to said stabilizing apparatus.

4. The stabilizing apparatus as recited in claim 3, wherein said mounting means includes at least one through-hole for accepting at least one mounting bolt for mounting said accessory to said stabilizing apparatus.

5. The stabilizing apparatus as recited in claim 1, wherein said flanged collar splays outwardly from said mounting plate toward said base-body so as to overlap said protruding ring of said hitch receiver whenever said mounting plate and said T-shaped sliding pin barrel are drawn together by rotation of said draw bolt.

* * * * *